United States Patent [19]

Swearingen et al.

[11] Patent Number: 5,668,679

[45] Date of Patent: Sep. 16, 1997

[54] SYSTEM FOR SELF-SERVOWRITING A DISK DRIVE

[75] Inventors: Paul A. Swearingen, San Jose; Stanley H. Shepherd, Morgan Hill, both of Calif.

[73] Assignee: Quantum Corporation, Milpitas, Calif.

[21] Appl. No.: 576,182

[22] Filed: Dec. 21, 1995

[51] Int. Cl.⁶ ..................................................... G11B 21/02
[52] U.S. Cl. .............................................. 360/75; 360/77.07
[58] Field of Search ..................... 360/75, 77.02, 360/77.05, 77.06, 77.07, 77.08, 77.11

[56] References Cited

U.S. PATENT DOCUMENTS

| | | | |
|---|---|---|---|
| 4,107,746 | 8/1978 | Conway | 360/78 |
| 4,157,577 | 6/1979 | Porter, Jr. et al. | 360/77 |
| 4,587,579 | 5/1986 | Cocke et al. | 360/75 |
| 4,920,442 | 4/1990 | Dimmick | 360/137 |
| 5,448,429 | 9/1995 | Cribbs et al. | 360/75 |
| 5,541,784 | 7/1996 | Cribbs et al. | 360/75 |
| 5,583,712 | 12/1996 | Brunelle | 360/78.04 X |

*Primary Examiner*—Andrew L. Sniezek
*Attorney, Agent, or Firm*—David B. Harrison; Debra A. Chun

[57] ABSTRACT

A servowriter capable of non-invasively servowriting a magnetic recording disk drive controls the drive's on-board electro-mechanical head-position actuator system and read/write interface to self-servowrite the target drive. A head within the drive is used to write, open loop, a set of spiral tracks having embedded timing information. The spiral tracks are subsequently used to position the head so that standard embedded servo wedges can then be written. After the standard embedded servo wedges are written, the spiral tracks may be overwritten with user data.

7 Claims, 9 Drawing Sheets

TRACK POSITION = TIME FROM INDEX TO SPIRAL CROSSING

SYSTEM FOR SELF-SERVOWRITING A DISK DRIVE

FIELD OF THE INVENTION

The present invention relates generally to methods and apparatus for post-assembly, self-servowriting a magnetic recording disk drive. More particularly, the present invention relates to methods and apparatus capable of non-invasively writing servo information, such as embedded servo sectors, on a disk in a magnetic recording disk drive by using the drive's electro-mechanical, head-position actuator system.

BACKGROUND OF THE INVENTION

Disk drives typically employ electromagnetic read/write heads to store and recover information from the recording surfaces of rotating disks. The disks generally include a high coercivity magnetic storage layer at each planar surface. Data is normally stored along concentric data tracks in the magnetic storage layer. For disk drives having more than one data recording surface, the set of tracks at a common radial location is referred to as a cylinder. Head positioning relative to a track or cylinder is usually performed using a closed-loop servo scheme, so that the head(s) can be precisely positioned and can track-follow. Servo positioning can be performed with respect to servo data recorded solely on a dedicated disk surface (i.e., "dedicated-servo") or with respect to servo information embedded in every track of every recording surface (i.e., "embedded-servo"). The latter servo scheme tends to provide more accurate head positioning and in the case of a disk drive having few disks, an embedded-servo scheme will tend to use a smaller percentage of the potential data storage area for servo overhead. Accordingly, disk drives incorporating embedded-servo schemes currently dominate the market.

In order for an embedded servo drive to operate properly, the servo information that ultimately defines the position of the data tracks must be written with great accuracy. Typically, the servo information is written on each surface as a radially extending set of spokes or "wedges." The portion of a servo wedge at a particular track location typically contains a sync field, an index mark, a gray coded track number, and two or more fine-position, offset bursts configured in an echelon across the track. Other formats and servo patterns are also employed within embedded servo disk drives. Head positioning relative to a track center can be determined and corrected, if necessary, by reading and noting the respective amplitudes and timings of these latter offset bursts.

Traditionally, the machine used to write the embedded servo information is called a servowriter. A servowriter typically includes a large, massive granite base to minimize the effects of vibration, precision fixtures to hold the target disk drive, a precision laser interferometer based actuator arm positioning mechanism to position the arms radially with respect to the axis of rotation of the disks in the drive, and an external clock head to position the servo wedges in time (i.e., at a particular angular offset with respect to a fixed radial line segment on the disk). See, e.g., FIG. 1 of commonly assigned U.S. Pat. No. 4,920,442. Conventional servowriters are expensive.

Typically, a drive to be servowritten must be servowritten with its cover removed or with at least two external openings to permit the insertion of the clock head and the arm positioning mechanism when the drive is mounted on the servowriter. The requisite openings or holes give rise to several problems because the holes adversely affect the mechanical integrity of the disk drive's base casting or baseplate, thus causing stiffness and resonance related concerns. Also, the cutouts provide an ingress for contaminants which can easily ruin a disk drive. Servowriting with the drive's cover removed amplifies these problems. The entry of contaminants not only increases tribology related problems, but more importantly, because the spacing between a head and disk is typically not more than a few microinches, the entry of even microscopic particulate contaminates can lead to a catastrophic failure such as a head-to-disk crash. Accordingly, servowriters are usually installed in a clean room in order to avoid contaminating the target drive.

In a prior art servowriting process, a target drive to be servowritten is mounted on a fixture that is rigidly attached to the stabilizing granite base. The drive is not fully assembled at this stage of manufacture, hence the partially assembled drive is sometimes referred to as a head disk assembly (HDA), which usually includes a baseplate with the spindle motor, actuator assembly, heads, disks and some of the electronic circuitry installed. A clock head is inserted into a hole in the HDA and a precision fixture is attached to or inserted in the HDA to provide feedback to a laser sensor mechanism used to physically position the recording head(s) to write the servo wedges at the appropriate radial locations during the servowrite operation. Because both the arm positioning mechanism and the clock head need to be physically inserted into the drive, the required HDA openings necessitate the use of a clean room environment for the servowriting operation. The physical insertion of a clock head into a disk drive HDA also creates a potential for clock head-to-disk crash, so conventional servowriting is a potentially risky operation for the target drive. The clock head is used to write a clock track, using one of many well known methods, near the outer edge of one of the disk surfaces. Then, a phase locked loop is locked to the clock track. The phased locked loop clocks a counter that is reset once per revolution. As the spindle motor speeds up or slows down, the phase locked loop will accurately track circumferential position at all times. Having thus established an accurate determination of the disk phase, the servowriter then uses the laser-interferometer controlled arm positioning mechanism to accurately position the heads radially with respect to the axis of rotation of the disk(s) and proceeds to dump (i.e., write) the servo data.

Due to the incorporation of large granite structures, laser based sensors, and high precision fixtures, present servowriters are extremely large and expensive. As track densities increase, the servowrite time also increases, which can create a bottleneck in the disk drive manufacturing process at the servowriter station. Therefore, the time that a disk drive HDA is being servowritten is expensive, because that time limits the achievable manufacturing throughput. Because laser-based servowriters typically require the use of a clean room dating normal operation to avoid contamination of the target disk drive, a hitherto unsolved need exists for an improved, lower cost, non-invasive servowriter and method which overcomes prior art limitations including, inter alia, high costs of procurement and operation.

SUMMARY OF THE INVENTION WITH OBJECTS

A general object of the invention is to provide a non-invasive servowriter for writing embedded servo information on the disk media contained in a magnetic recording disk drive.

A more particular object of the invention is to provide a servowriter that eliminates the need for the physical insertion of either an external control arm or a dedicated clock head into the target disk drive prior to or during servowriter operation.

Another object of the invention is to avoid both the large capital costs required for procuring a laser based servowriter and the large operating costs associated with providing a clean room operating environment for operation of a laser based servowriter.

An additional object of the invention is to provide a software programmable servowriter system capable of being readily adapted for use with a variety of different disk drives and servo patterns.

Yet another object of the invention is to eliminate the possibility of clock head-to-disk crashes attendant to the operation of prior art servowriters.

A further object of the invention is to provide a non-invasive method for servowriting a disk drive.

Yet another object of the invention is to provide a method of servowriting that eliminates the need for an external control arm, a dedicated clock head, and their attendant fixtures.

In one example of the invention, a microprocessor controlled servowriter which includes a read/write interface, an arm driver, and a motor driver is noninvasively attached to a target drive and a host computer that provides a user-level interface for controlling servowriter operation. The drive is initially blank and contains no servo information. Although closed-loop servo controlled arm positioning is not yet possible, it is possible for the servowriter to move the drive heads to the crash stops at the outer diameter (OD) and inner diameter (ID). The initial phase of servowriter operation is to test and characterize the drive heads at the OD and ID so that read/write operations can be tuned such that the readback signal amplitude is relatively consistent from OD to ID, notwithstanding the occurrence of head skew, velocity changes, and head-to-disk spacing changes from OD to ID. A clock track is then written at the OD. The present servowriter does not require (but does not preclude) the insertion of a dedicated clock head. Instead, it can write a clock track utilizing, for example, feedback from the output of disk drive's spindle motor. A microprocessor is programmed to generate an accurate virtual clock signal derived by reading and characterizing the actual data read from the recorded clock track (a more conventional clock track having "closure" may also be utilized, if desired). The next phase of the servowriting process involves tuning an open loop seek from OD to ID. Initial tuning is performed by executing progressively stronger OD to ID seeks until the back EMF from the disks drive's actuator coil indicates that the ID has just been reached. The acceleration, coast, and deceleration phases of the arm seek are then tuned so that the OD to ID seek takes a predetermined amount of time. For example, a spiral which takes two revolutions to write will require a tuned seek of exactly two rotational periods of the disk drive's spindle motor. Once a repeatable, tuned seek profile is established for the desired spiral configuration, a plurality of high frequency spiral tracks, with embedded "missing bits" for high resolution timing are written during the execution of tuned seeks starting at equidistant points about the OD, which points may be determined with reference to the clock track. The head is then perturbed slightly from the OD into the spiral tracks. Spiral track peak counts and missing bit data are read from the disk and that information is then characterized in a table stored in RAM (in the servowriter). A VCO is locked to the missing bit data in the spirals to, inter alia, accurately track the disk angular position. As the head is moved radially, the detected spiral peaks shift in time relative to a once-per-rotation time index mark, however the missing bit data does not, so the arm servo can be locked to the time offset from the triggering of a time index mark to the detection of a signal peak occurring due to the detection of a recorded spiral. Having thus locked the VCO and the arm servo, data wedges can be written with the disk drive's heads by multiplexing between reading spirals and dumping (writing) wedges. The integrity of the written wedges is verified and then the spirals may be overwritten with user data, as they are no longer required.

Briefly, a method for servowriting a disk drive in accordance with the present invention generally includes the steps of connecting a target disk drive, characterizing the heads at the ID and OD, writing a clock sync track at the OD, timing a seek profile, writing a set of high frequency spiral tracks, moving the head(s) into the recording band, characterizing the spiral peak counts and phases, establishing VCO servo control (i.e., servo "locking"), establishing arm servo control, moving the head(s) to a starting track, and finally, servowriting and verifying the entire drive.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
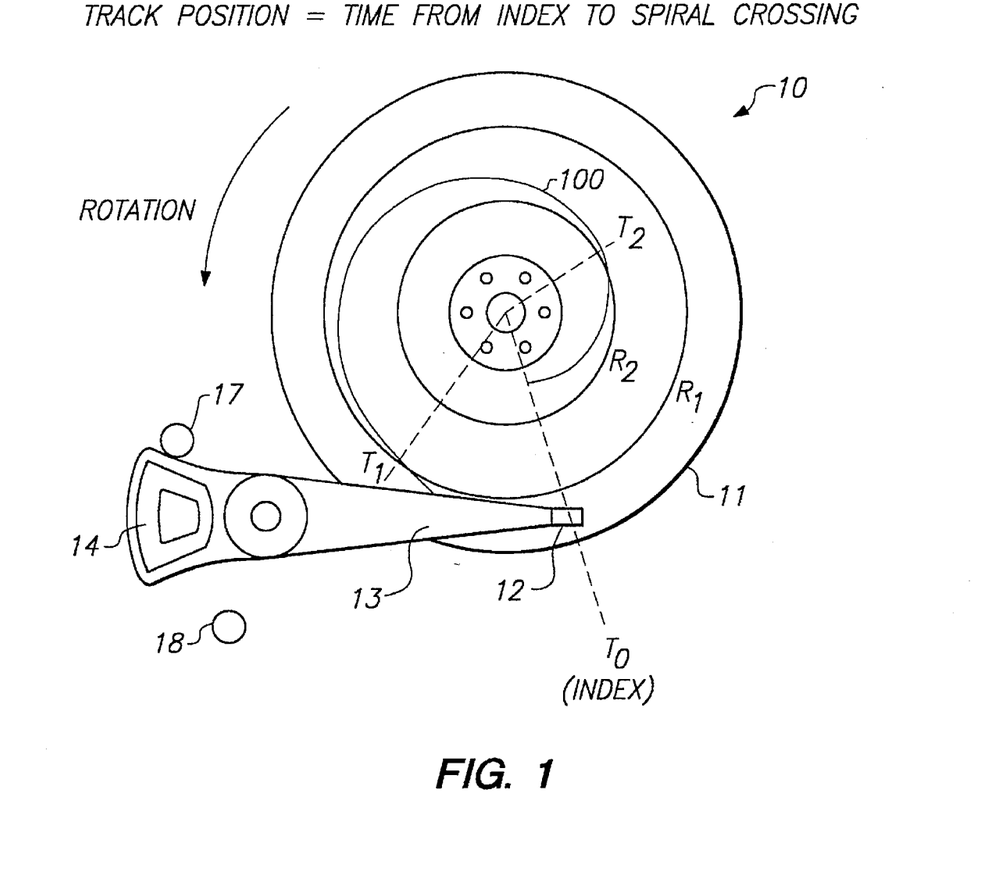
FIG. 1 is a diagrammatic plan view showing the configuration of a recorded spiral track on a magnetic disk in accordance with principles of the present invention.

FIG. 1 is a plan view of an HDA 10 showing a magnetic disk 11 mounted to a rotatable spindle motor (not shown), a positionable read/write transducer (head) 12 attached to a pivoted actuator arm 13, two cylindrical crash stops 17 and 18, and a voice coil 14. When energized, voice coil 14 interacts with the magnetic field produced by conventional stator magnets (not shown) to selectively accelerate actuator arm 13 relative to disk 11, thereby allowing head 12 to be positioned at different radial locations, e.g., at rings $R_1$ and $R_2$, which represent two arbitrary, distinct radial "track" positions on the surface of the magnetic disk. When the HDA is servowritten in accordance with a predetermined servo pattern, servo control electronics carried on a drive printed circuit board (PCB) will enable precise positioning of the actuator arm 13 and head 12 based upon information read from the servo pattern. One example of an HDA 10 is disclosed in FIGS. 5, 6, and 7 of commonly assigned U.S. Pat. No. 5,255,136 to Mathado et al., the disclosure thereof being incorporated by reference.

Figure 2:
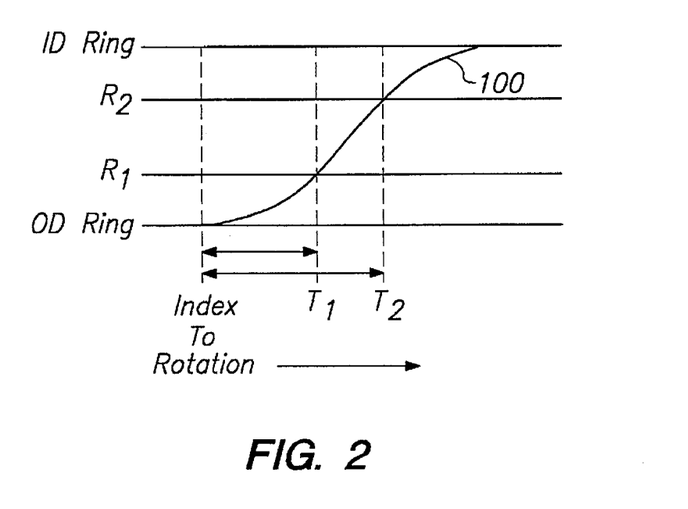
FIG. 2 is a diagrammatic graph showing an isomorphic mapping of the recording band of the magnetic disk of FIG. 1 onto a rectangular region.

Before disk 11 is servowritten, it is not generally possible to selectively and precisely position head 12 at any particular track location (e.g., at track $R_1$ or $R_2$) due to the lack of positional feedback from disk 11. It is possible, however, to move head 12 "open-loop" to head positions at the outer diameter (OD) and inner diameter (ID) which form the boundaries of the disk's potential recording band using crash stops 17 and 18 for reference. Since head 12 can be moved open-loop from the OD ring to the ID ring (or vice versa), it is possible to write a spiral track 100 across the usable disk surface ("recording band") between the OD and ID rings by seeking across the disk while concurrently writing a constant amplitude, high frequency signal. If voice coil 14 were then energized to displace head 12 to the recording band and if no current were subsequently applied to voice coil 14, then arm 13 would remain stationary and once per revolution, high frequency information recorded in spiral track 100 would pass under head 12. As shown in the linearized data band representation illustrated in FIG. 2, at track position $R_1$, spiral track 100 would pass under head 12 at a time offset $T_1$ (relative to the index $T_0$) and at track position $R_2$, spiral track 100 will pass under head 12 at a different time offset $T_2$. Thus the time offset from time $T_0$ to the detection of a spiral track 100 may be used to provide positional feedback on radial head location, provided that time $T_0$ can be reliably determined while the head is operated within the recording band.

Figure 3:
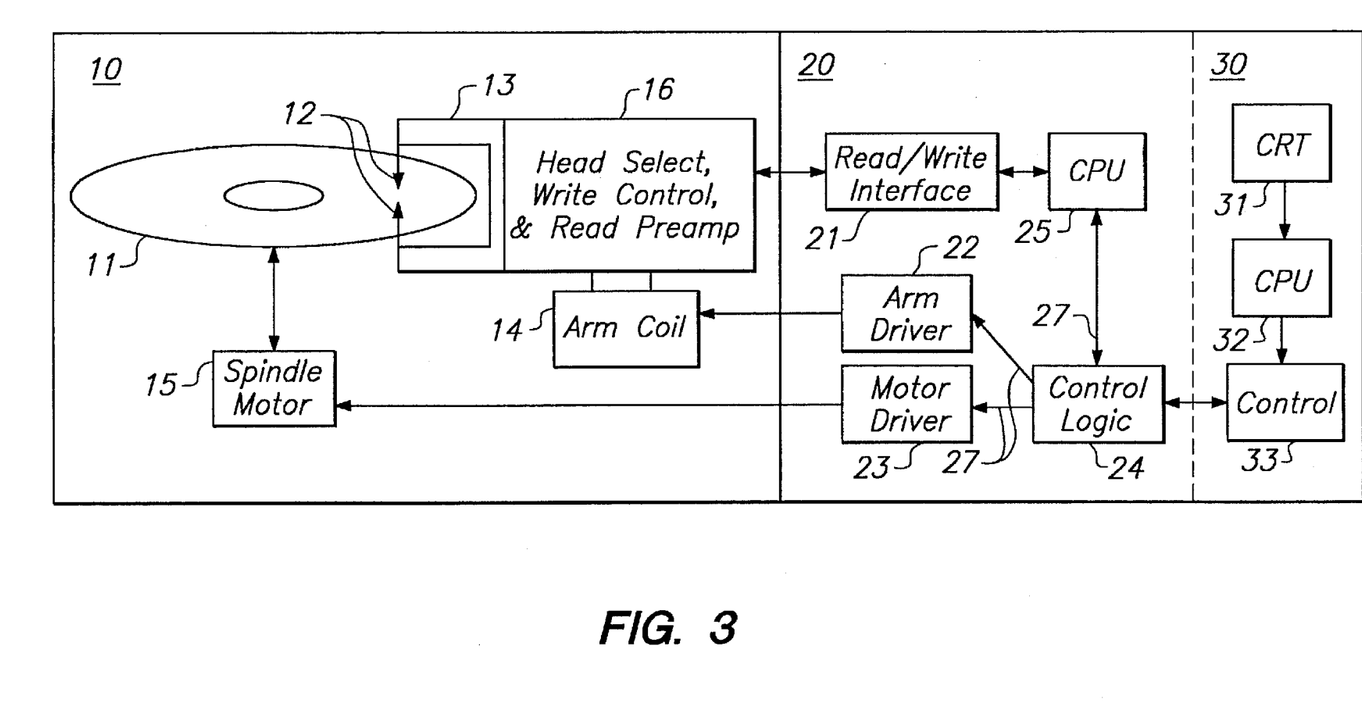
FIG. 3 is a simplified, high-level block diagram showing the relationship between a disk drive head-disk-assembly, a host computer and a servowriter embodying the invention.

FIG. 3 shows a high level block diagram of an in situ servowriter 20 in accordance with the present invention. Three main functional blocks are illustrated. The first is head-disk-assembly (HDA) 10 which is the disk drive to be servowritten (and which is not part of the servowriter). HDA 10 contains magnetic disk 11, head(s) 12, actuator arm 13, voice coil motor 14, spindle motor 15, and head control circuitry 16 that writes, reads, and selects the appropriate one of head(s) 12. Aside from the spindle motor electronics, all of the HDA electrical signals normally pass through a single connector that is accessible from the exterior of HDA 10. The second functional block is servowriter 20. Servowriter 20 includes a read/write interface 21, an arm driver 22, and a motor driver 23, the latter drivers being controlled via control logic 24 governed by main high speed microprocessor (CPU) 25 via CPU bus 27. Servowriter 20 is operated via the third functional block, a host computer 30. Host computer 30 is conventional and typically includes a display tube (CRT) 31, a microcomputer CPU 32, and control circuitry 33 to interface with control logic 24 of the servowriter 20. Host computer 30 may be programmed to operate several servowriters 20 concurrently and is the highest level user interface to the servowriter(s) 20. This host computer 30 down-loads software, starts and stops servowriter operation, and up-loads test results to be dumped into a database for e.g. later statistical analysis.

Figure 4:
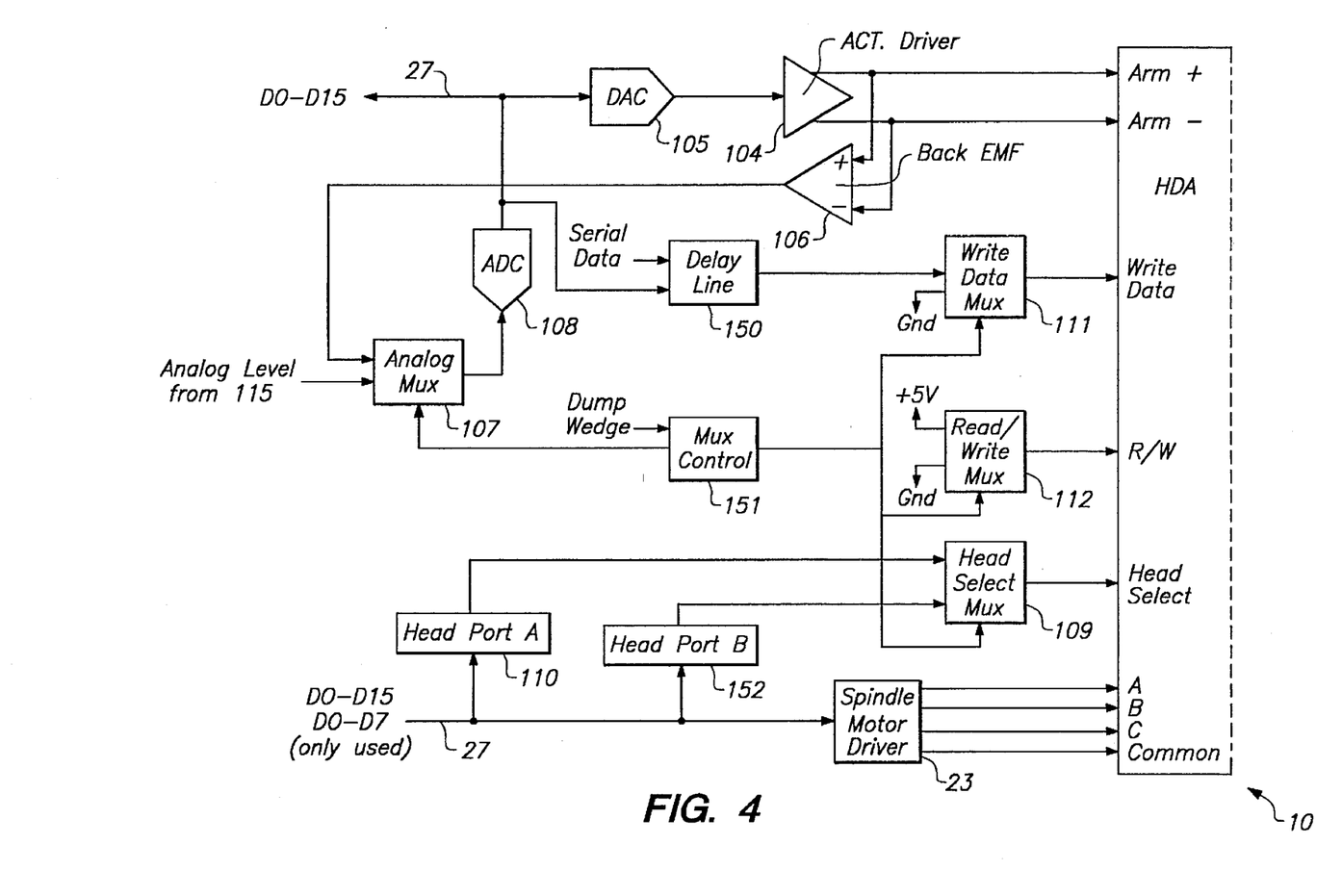
FIG. 4 is a block diagram of a servowriter interface circuit for interconnecting the FIG. 3 HDA and servowriter.

To begin servowriting, HDA 10 is installed into a test fixture forming a part of servowriter 20. Disk 11 is spun up using the spindle motor driver 23 which, in this embodiment of the invention, contains an 8-bit microprocessor and comparators (not shown) that are used to characterize the timing of multiple zero crossings of the spindle motor. The spindle motor driver's microprocessor can therefore communicate rough circumferential position back to main high speed processor 25 via CPU bus 27. When the disks are up to speed, all the heads and disks are checked for functionality and quality both at the ID and the OD of the stroke of the arm. Turning now to FIG. 4, the actuator arm is controlled by a constant current H-Bridge output stage amplifier 104 that is driven from a high resolution DAC 105. A low gain back-EMF sensing amplifier 106 is used to sense actuator velocity and thereby determine when the crash stops are encountered by actuator 13. Amplifier 106 may also be used to help generate a constant arm velocity during erasure seeks, in the event that in situ disk erasure is required. The output of this amplifier 106 feeds an analog mux 107, whose selected output gets digitized using a flash 10-bit ADC 108 which can then be read with high speed microprocessor 25 via CPU bus 27.

During the head/media checking process, rings of high frequency data are written out to all heads, in sequence, and the recorded signals are then read with the heads so that the amplitude of each head read signal can be checked and noted. An appropriate head may be selected using a head select MUX 109 and HEAD PORTS A and B, 110 and 152, respectively. Next the data must be written out using the HDA Write Data Line through a write data MUX 111. Also, the R/W signal is controlled using a read/write MUX 112 and the data is written when the output of the read/write MUX 112 goes low. Notice the inputs to read/write MUX 112 are connected to +5V and Gnd. The input to the write data MUX 111 comes from the HF Clock signal that is generated using a programmable counter 113 (see FIG. 6).

Figure 5:
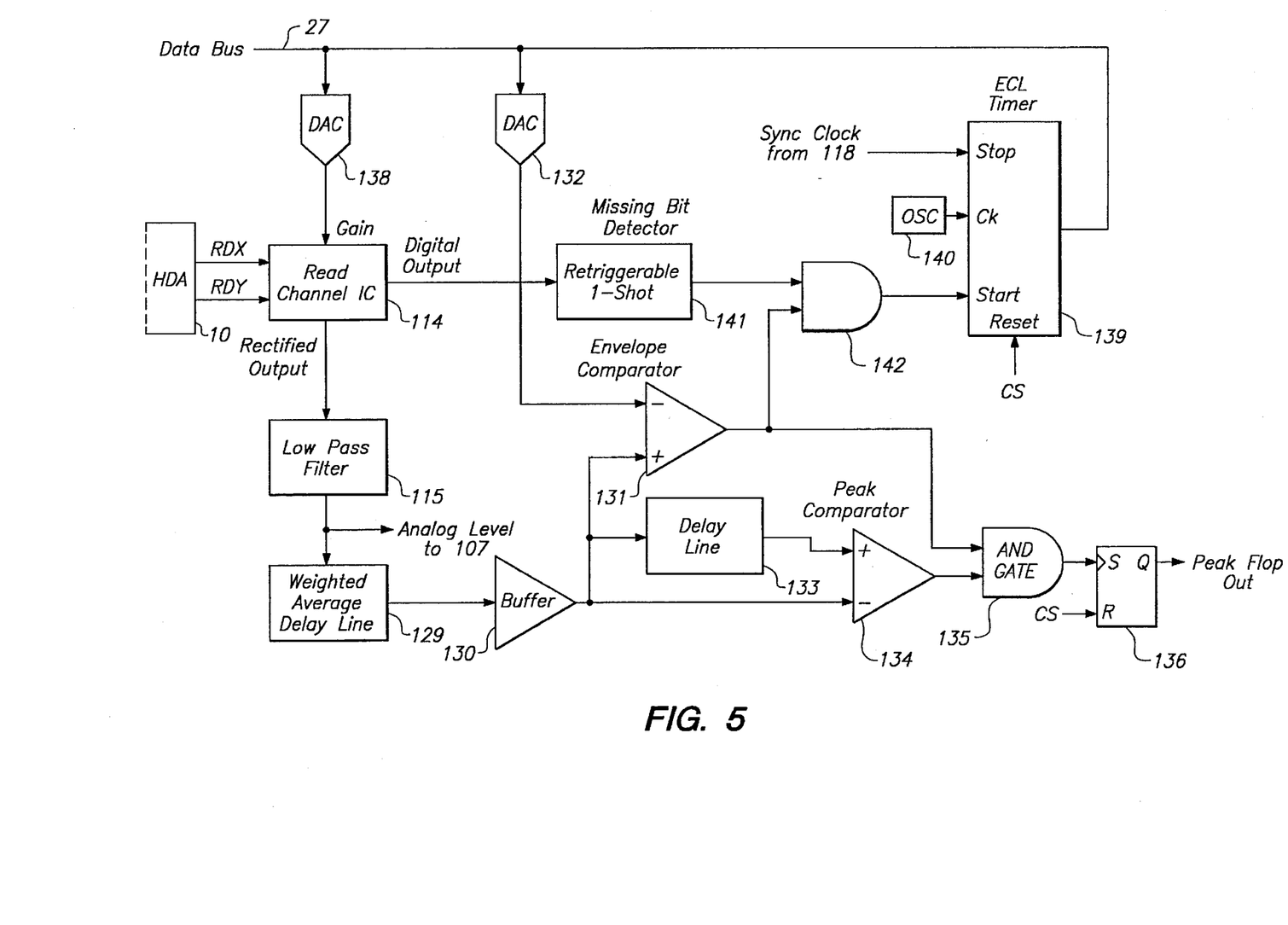
FIG. 5 is a block diagram of a circuit within the FIG. 3 servowriter for spiral detection and timing data extraction.

After the high frequency data is written to the selected disk, it needs to be read back. As shown in FIG. 5, the gain of read channel IC 114 is controlled by a high resolution DAC 138 so that the envelope amplitude can be made relatively consistent. As the heads move from the OD to the ID the gain may be adjusted so that signal strength variations caused by varying head flying height, bit density, and head angle are reduced. The read path consists of the HDA RDX and RDY signals that feed a read channel IC 114. Read channel IC 114 is a conventional peak detector type IC that contains the following internal blocks (not shown): 1) Variable gain input stage 2) Programmable equalization filter 3) Differentiator 4) Full wave rectifier 5) Comparators and output peak 1-shot. (A partial-response, maximum-likelihood (PRML) read channel IC may optionally be employed instead.) During this portion of the process only the Full-Wave rectified output is used and it feeds the low pass filter 115. This signal is often used during the servowriting process in accordance with the present invention, whenever the overall read signal level amplitude needs to be checked rather than the bit-by-bit qualifies of the signal. This signal output then feeds the Analog MUX 107 (see FIG. 4) which can be digitized using ADC 108 (see FIG. 4) and read with high speed microprocessor 25.

Figure 6:
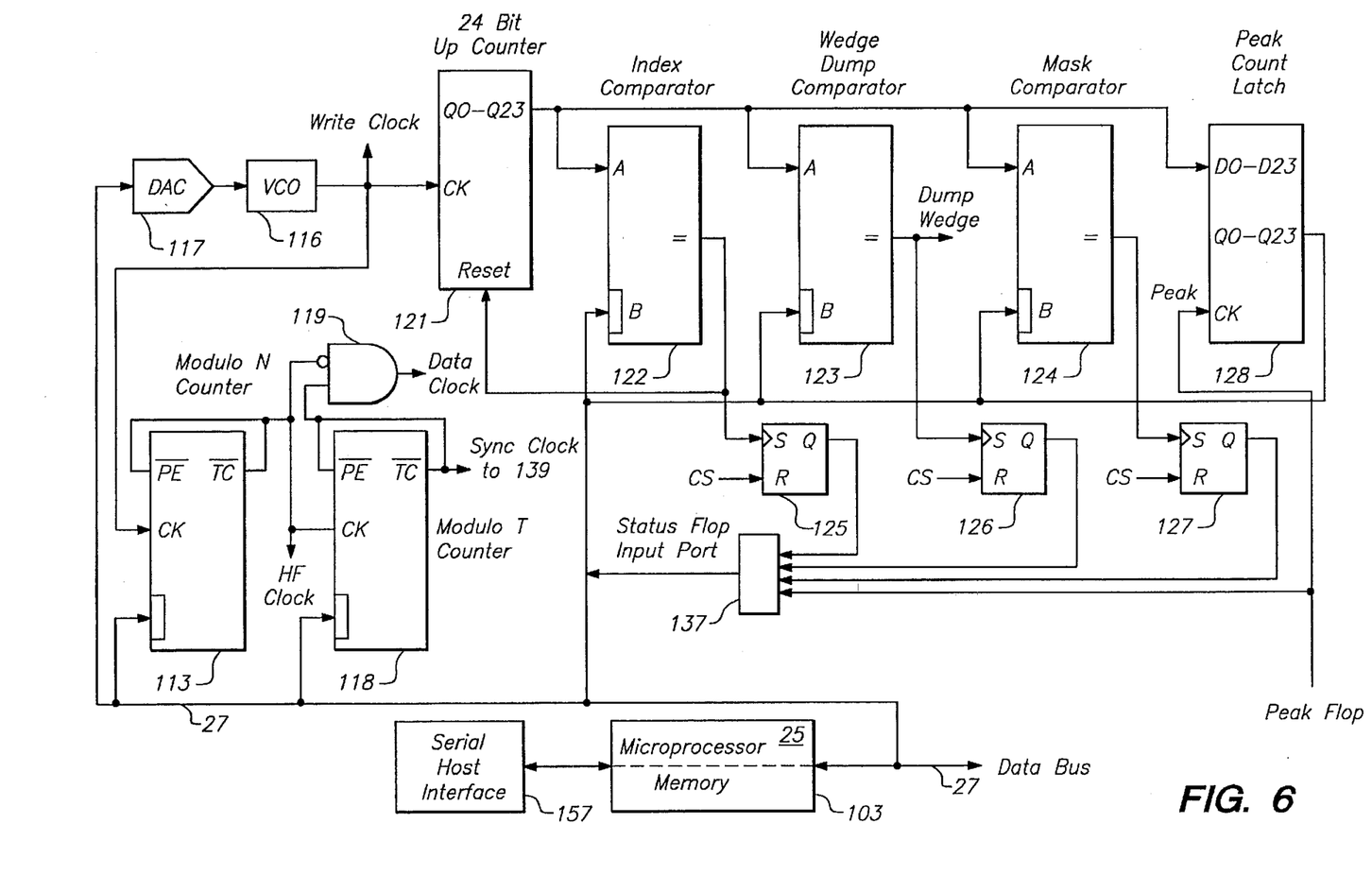
FIG. 6 is a block diagram of a circuit within the FIG. 3 servowriter for writing servo wedges.

A clock synchronization track must then be written at the OD of one surface of one disk 11. The clock synchronization track is made up of a high quantity of small bursts of timing information. It is convenient to use the same number of bursts as the number of spirals that will eventually be written, which in turn depends, in part, upon how many servo wedges are required to be written to each disk surface. Turning to FIG. 6, a sync clock is generated from a main VCO 116 that also generates a write clock signal. VCO 116 is driven from a high resolution DAC 117 that is driven from the microprocessor via CPU bus 27. Among other things the write clock signal feeds previously mentioned counter 113 which in turn feeds programmable counter 118. Using gate 119, a clock signal is generated called data clock that periodically suppresses a pulse. For instance, if counter 118 is programmed to 16, then every 16th pulse is suppressed. It is ultimately these missing pulses ("missing bits") that are later detected as a timing bits during the clock synchronization process (and during the spiral clock lockup process, since the missing bit pattern is also used while writing the spirals themselves). An initial clock track consisting of a plurality of regularly spaced sync bursts having embedded missing bits is recorded at the OD (inter alia, to establish a fixed reference which uniquely identifies $T_0$) by using internal head 12. Spindle motor zero-crossing feedback obtained from spindle motor driver 23 (see FIG. 4) is used to time the placement of the sync bursts. The written track is reread over many revolutions to obtain statistical samples for constructing an error table that may be used, in effect, to generate an accurate virtual clock and to establish reference mark $T_0$ based on detected data from the recorded clock track. An extra index sync burst is placed midway between the first and last sync bursts on the track, which allows high speed microprocessor 25 to unambiguously identify the sync track index location $T_0$ (shown in FIGS. 1 and 2).

The clock synchronization process involves first building a table in software by characterizing these peak time values from the sync bursts over multiple revolutions. VCO 116 can be coursely locked to these peak times using a conventional proportional-plus-integral-plus-derivative (PID) type servoing process. After this coarse adjustment is made there is another, much finer resolution timer that allows far tighter accuracy. FIG. 5 shows a high-resolution ECL timer 139, which provides a timer that starts on a positive going transition of the start input and stops on a positive transition of the stop input. ECL timer 139 is a high speed 500 MHz-1 GHz ECL timer and consequently needs appropriate voltage conversion levels. It is clocked with oscillator 140. ECL timer 139 times the phase between the first missing sync bit in a timing burst (or a spiral crossing) and the next rising sync clock edge. The peak detector type read channel IC 114 generates digital data that represents the bit-by-bit peaks of the data coming from the disk 11. This data will have gaps in it that coincide with the original clock data written to disk 11. A missing bit detector 141 is implemented by a retriggerable 1-shot that is adjusted to detect the presence of this longer gap and ignore the shorter gap in the signal. Missing bit detector 141 effectively recreates the clock timing, and after being gated with the envelope signal using an AND gate 142, the clock timing can be reliably used as the start input for ECL timer 139. Then the stop signal becomes the next rising edge of the clock coming from previously mentioned counter 118 (see FIG. 6). Once this finer phase relationship can be determined by ECL timer 139, another table is built in software which utilizes a routine that characterizes this phase relationship for each burst and the servoing process then switches over to this characterization table so that a tight VCO phase lock is established.

Synchronizing to the clock sync track involves the same sets of counter circuitry that will subsequently be used to synchronize to the spirals. FIG. 6 shows a 24 bit up counter 121 that serves as the main circumferential location counter. Counter 121 counts up and is reset once per revolution using digital Index Comparator 122. Comparator 122 is a 24-bit comparator with an input connected to high speed microprocessor 25 and is programmed so that it outputs a pulse in exactly the correct number of Write Clock counts. Main VCO 116 drives 24-bit counter 121. During normal disk speed modulations, when the microprocessor 25 has acquired phase lock, either to the sync clock track or to the spirals, the VCO/counter combination speeds up and slows down to track any spindle speed variations. There are two other digital comparators: Wedge Dump Comparator 123, and Mask Comparator 124 that are used to trigger wedge dumps and for spiral masking, both described later. Also, there are three status flops 125, 126, and 127 that allow microprocessor 25 to tell whether any of these comparators have equaled the programmed count of counter 121. These flops are reset with microprocessor chip select lines. Also connected to the output lines of counter 121 is the peak count latch 128. This latch is used to capture the current circumferential count of the peak of the analog disk read signal envelope, either while detecting sync bursts or spiral crossings.

Figure 8:
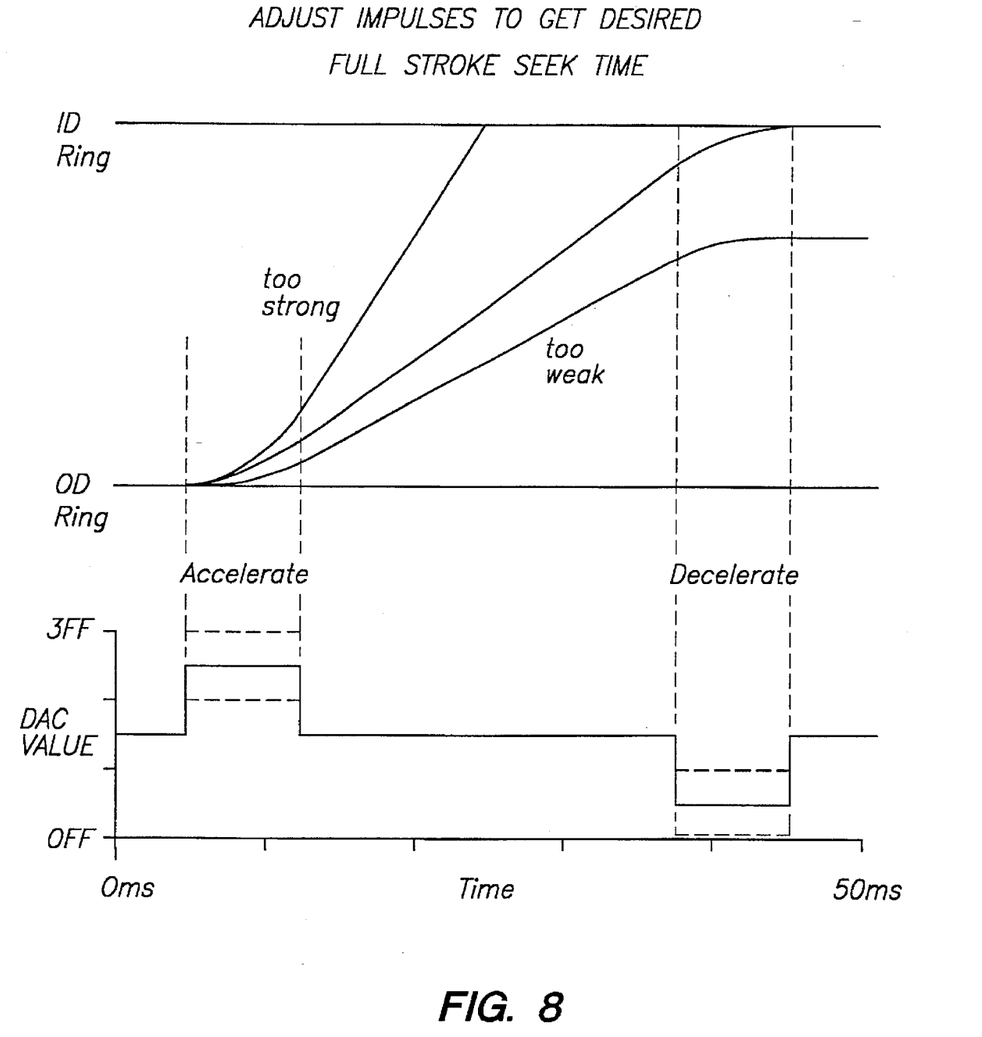
FIG. 8 is a graph illustrating the relationship of actuator input impulse magnitude to the actuator full stroke seek time in accordance with aspects of the present invention.

At this point the spiral seek velocity profile needs to be tuned to write (open-loop) spiral tracks accurately and repeatably. A carefully tuned accelerate/coast/decelerate seek profile should be employed to reduce the effects of flex circuit bias, bearing stiction and friction, and the like. An appropriate seek profile may be established as shown in FIG. 8, wherein an initial seek profile is tuned by repeatedly seeking head 12 from the OD to the ID and monitoring the back EMF from the actuator voice coil 14 to indicate when a crash stop has been encountered. In this manner, a seek can be iteratively adjusted using different accelerate/decelerate impulses until the seek takes exactly the desired amount of time. The head 12 is repeatedly seeked from OD to ID, and if the ID crash stop is not detected by the end of the seek, the seek is strengthened. Seek iterations continue until the ID crash stop is just detected in the allotted amount of time. For example, if the spiral is going to take exactly two disk revolutions to write, the tuning process adjusts the seek profile so that after exactly two rotational periods elapse, the ID crash stop is detected. An alternative technique may be employed for tuning seeks which uses information written at the ID ring to provide feedback at the end of the seek stroke instead of monitoring the back EMF from the actuator voice coil 14.

After an appropriate seek profile is tuned, the resultant seek profile is used to write hundreds of spirals. At this point the clock synchronization track is used to first lock VCO 116 to determine the starting locations for writing spirals. Returning to FIG. 6, this is accomplished using 24-bit counter 121 along with digital comparator 124, status flop 127, and status port 137. There are many warm-up seeks done in which no spirals are written, just to stabilize the electronics, and then the spirals themselves are written. For high precision radial head positioning, many spirals are ultimately required. The advantage of having more spirals is that the more spirals there are, the tighter the trackability of the servo system on the center of each track (when eventually servoing on the spirals). As shown in the linearized data band representation illustrated in FIG. 10, if there are 2–4 open spirals 100 between each pie shaped servo wedge 200, servo positioning accuracy can be quite good. Thus the next step is to place 100–500 spirals on one surface of a disk platter which will yield about 50–125 conventional pie shaped servo wedges per disk surface. These spirals are spaced at equal intervals about the disk OD ring and if the seek speed is great enough they will remain fairly equally spaced throughout the duration of the seeks. When the disk drive is servowritten using these spirals, any small variations in spiral drift (due to the open loop nature of the seeks) will be averaged into a table that is referenced and dynamically updated during the servo operation using a high speed microprocessor, so that corrected virtual data can be generated from the detected recorded data. An "index" spiral is written just during the accelerate portion of a seek and is recorded mid-way between the first and last spirals (i.e., on most of the disk surface, the index spiral is gone, but near the OD the index spiral is detectable) so the rotational phase of the disk corresponding to $T_0$ may be uniquely established.

As the high frequency spirals are written, once every 16 high frequency cycles (for example), a cycle is dropped (or shifted), thereby creating a missing bit. Preferably, there should be about 3–8 missing bits per spiral crossing, which has only a small effect on the spiral envelope shape, but provides the necessary high resolution timing information. The missing bits (i.e., timing bits) are fixed with respect to the surface of the disk and with respect to $T_0$ so that when the head moves back and forth from track to track the spiral track envelope peaks shift in time, but the extracted missing bits remain stationary with respect to $T_0$. Thus a VCO can be phase locked to the missing bits embedded in the spirals to provide high resolution timing and disk phase information, including identification of $T_0$, while the head is operated in the data band away from the clock track.

Figure 9:
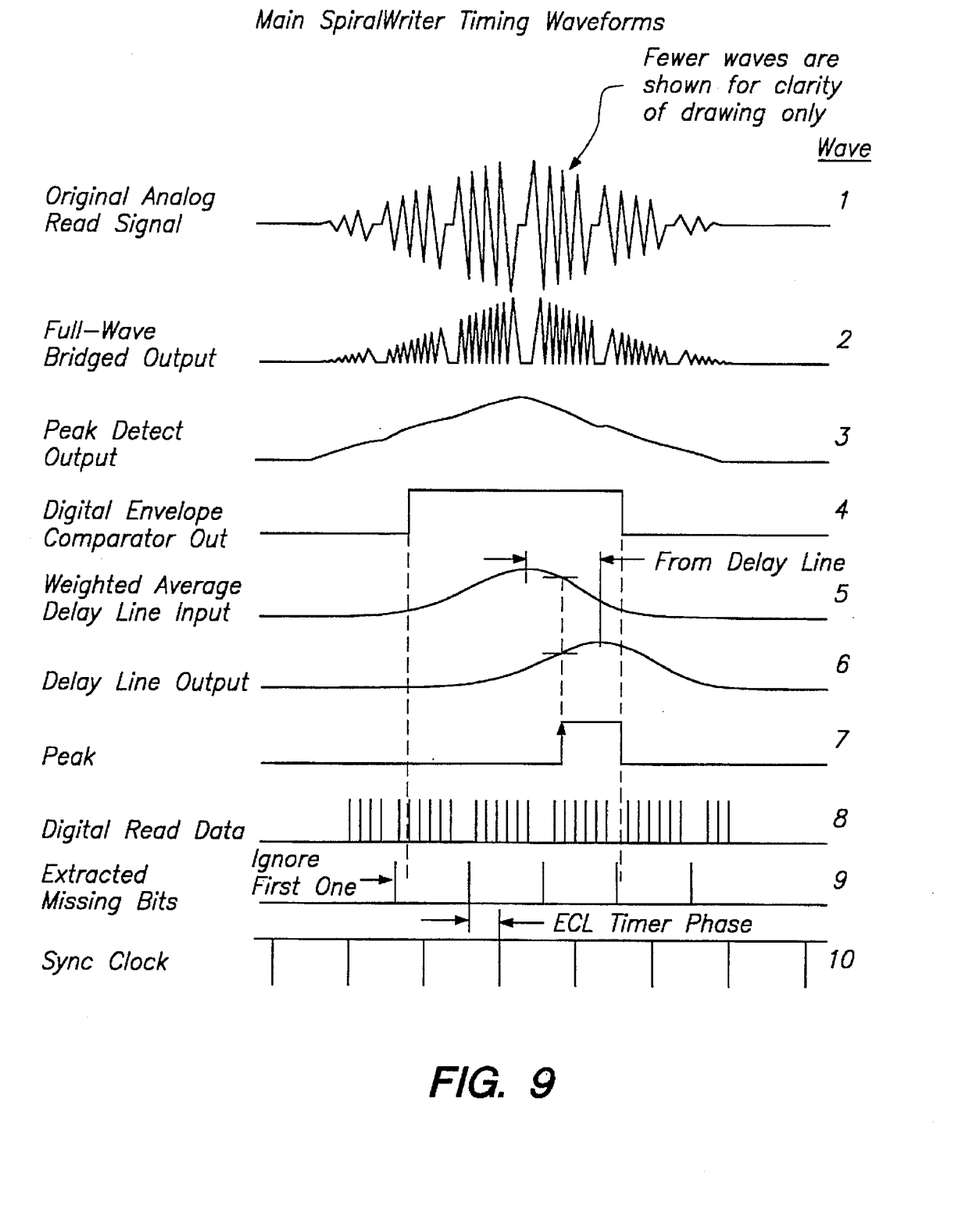
FIG. 9 is a graph along a common time base comprising a series of related diagrams showing how timing and phase information may be extracted from the readback of a recorded spiral track in accordance with aspects of the present invention.

The next step is to jump from the OD out onto the spirals about ⅛" out and lock up the VCO. When head 12 is positioned at the clock track at OD, $T_0$ is known. When the head is moved just outside the clock track, it encounters the spiral tracks, including the embedded missing bits. The derivation of the timing pulses corresponding to the missing bits can be performed in the digital domain by utilizing the digital output (FIG. 9, Wave 8) of the read channel IC 114. FIG. 9, Wave 9, shows the output of a retriggerable 1-shot 141 after detecting a gap in the output (FIG. 9, Wave 8) of the digital bit-by-bit peak detector of read channel IC 114. FIG. 9, Wave 10 shows a portion of the continuous sync clock line during this time. High resolution ECL timer 139 then times the delta between the first sync bit shown in FIG. 9, Wave 9 (after the digital envelope Wave 4 goes high) and the subsequent sync clock shown in Wave 10. This then becomes the all important phase measurement with which the microprocessor 25 locks VCO 116, thus synchronizing VCO 116 speed to the disk rotational speed. Microprocessor 25 is programmed to close the loop and servo VCO 116 on the phase differences between the actual measurement and the expected measurement located in a table. By utilizing a microprocessor, it is possible to perform many other mathematical averaging and predicting functions that help in the overall quality of tracking VCO 116 to the spindle motor speed variations. VCO 116 directly provides the clocking to time the dumping of the servo wedge data that are to be written to the surfaces of the disks. Also, whenever a sample (either peak or timing information) is missed, an approximated sample based upon the expected value can be generated by the microprocessor to produce a servo update anyway, notwithstanding the missing datum.

The detection of a spiral crossing is performed, with reference to FIG. 5, by sending the rectified read channel 114 output through a low pass filter 115 to an envelope averaging circuit called the Weighted Average Delay Line 129. This circuit consists of a multiple tap analog delay line with equally weighted resistors mixing the outputs to one common point. This output provides a weighted average, much smoother representation of the original signal and averages out the effects of the missing timing bits that were written to the disk surface. This is especially useful while tracking on the spirals because any disruption in the envelope can cause slight track misregistration. This output then is buffered by buffer 130 which feeds into an envelope detector comparator 131 that is simply a level detector that is used to determine whether the envelope gets above a predetermined limit set by DAC 132. The output of buffer 130 also goes into an analog delay line 133 and into comparator 134 so that the original and delayed versions of the envelope can be compared and effective spiral or sync burst position can be determined. This signal is gated with the envelope using AND gate 135 and this Peak signal is used to strobe the current 24 bit count into Peak Count Latch FIG. 7 128. After this occurs, flop 136 will indicate a peak has been crossed and the latched peak count may be reliably read from the microprocessor. The set of peak crossings during a single rotational period are characterized bu microprocessor 25 and stored in a RAM table.

The signals processed incident to spiral peak detection process are illustrated in FIG. 9. Upon each crossing of a spiral track, the read channel detects a signal which appears similar to a diamond (Wave 1), starting with zero initial amplitude, then linearly increasing to full amplitude, and then linearly diminishing to zero amplitude. This readback signal is fed into a full-wave-bridge circuit (internal to Read Chanel IC 114) and the resultant rectified output appears as shown in Wave 2. Next, the signal is passed to low-pass filter 115 to create the roughly triangular envelope shown in Wave 3. The time at which the spiral peak is detected is accomplished using two analog delay lines 129 and 133, respectively and peak comparator 134. The averaged analog signal (Wave 3) feeds the input of weighted average delay line 129. Taps from delay line 129 feed resisters that sum together resulting in the output shown at Wave 5. This summed point feeds one side of another analog delay line 133 (resulting in Wave 6) and also one side of digital comparator 134. The output of the second delay line (Wave 6) feeds the other side of the digital comparator 134 which provides digital output Wave 7, which provides information corresponding to the time that the spiral peak is detected. For all practical purposes, the averaging of the first delay line cancels any irregularities caused by the missing bits, hence the smooth appearance of Wave 5 and Wave 6. The output envelope Wave 3 also feeds a comparator 131 that generates digital envelope signal Wave 4 that is used to gate the output of the above mentioned comparator 134 to make digital signal Wave 7 fall at the end of the envelope. It is the rising edge of this latter signal that is used to clock the detection of a spiral peak.

After the VCO 116 is locked up and is servoing on the missing sync bits, the arm servo software can lock the arm on the spiral envelope peaks coming from gate 135 (see FIG. 5) by comparing the detected peak times with the characterized peak times previously stored in the RAM table (this peak characterization table may be the same as that previously established for coarse, initial VCO control prior to the establishment of sync bit servo control). It should be noted that there are now two simultaneous servo loops taking place, both controlled by high speed microprocessor 25. Also, at the same time the software ongoingly averages any slow moving drift of either the peak times or the timing sync bit times vs. sync clock times into their respective tables. This way if the spirals do tend to drift toward each other a little as the arm moves toward the ID, adverse effects can be minimized. Similarly, if the spindle motor just happened to be accelerating during the writing of a particular spiral, the slight timing drifts throughout the duration of the spiral can be compensated for. In both cases this characterization tends to adjust the two tables so that a smooth nominal operating reference point is achieved throughout the servowriting process.

Next, head 12 is slowly moved back to the edge of the index spiral to identify the track 0 starting location. This process can be performed in about a second or so. Then spiral integrity can optionally be checked to verify, inter alia, that the spirals do not run into each other toward the ID by slowly moving to the innermost track and then back to track 0. This can take about 10 seconds. At this point, the drive may be considered to have been servowritten, albeit with a nonstandard servo pattern.

Figure 7:
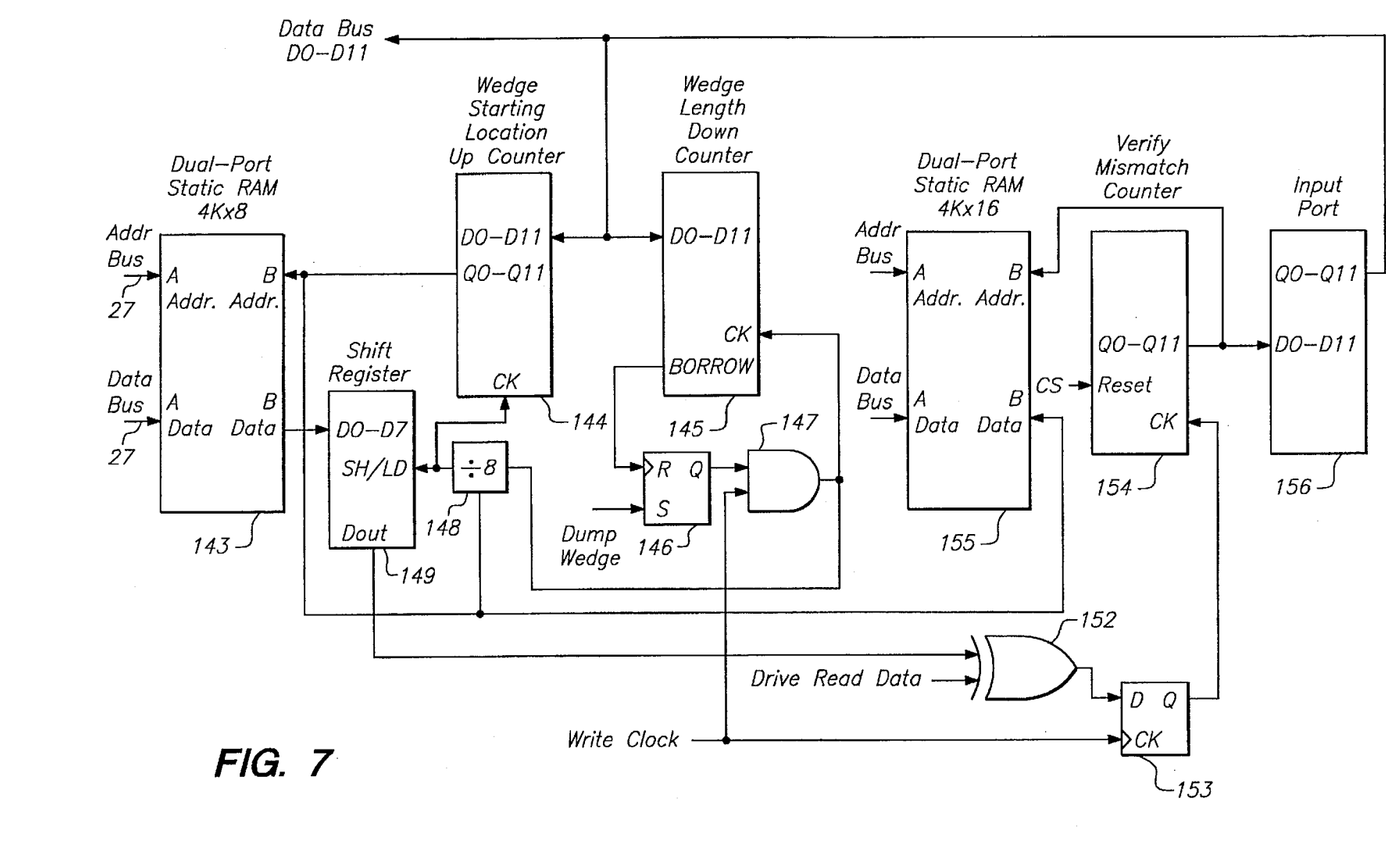
FIG. 7 is a block diagram of circuitry within the FIG. 3 servowriter used to verify written servo wedges.

The final step in yet another preferred embodiment of the the present invention is to dump conventional servo wedge data to the disk. As described earlier, the servo wedges are small pie shaped slivers of information which typically contain a sync field, an index mark, a gray coded track number, A, B, C, and sometimes D bursts that are used for track following, and a verification end field. Servo wedges are generally required on each surface of each disk in the drive and take up about 10% of the total recording area. The wedges are written on half-track (or one-third-track) centers so that the written wedge portions end up overlapping themselves, radially. Spirals are only required on one surface of one disk because the present invention is programmed to multiplex between servoing on the spiral surface and dumping wedges on the same or other surfaces. Recall that a wedge dump is triggered by digital comparator 123 and this sets flop 126 (see FIG. 6). As represented in FIG. 7, specific wedge data is programmed into dual-port RAM 143 as a stream of 1's and 0's packed into 8-bit parallel bytes. The patterns are programmed from the left A side of the dual-port RAM and then the patterns are later dumped using the right B side. During an actual wedge dump up counter 144 counts through bytes addressed at the B side of the RAM and counter 145 counts down from a programmed value until it does a borrow that resets flop 146 which gates off, using gate 147, write clock pulses from feeding counter 145, divider 148, and serial shift register 149. Counter 144 acts as a starting location counter that is programmed by the microprocessor and counter 145 performs as a length counter. In this way a wedge of any practical length may be dumped starting from any practical location in the dual-port RAM address space. The wedge data comes out of serial shift register 149 in the form of a serial stream of data. Its Shift/Load line comes from the carry of counter 148 and new parallel data is automatically loaded once every 8 write clock cycles. Once the wedge data leaves shift register 149 it then goes through a variable delay line 150 (see FIG. 4) that is software programmable from the microprocessor. This is a 5 to 8-bit binary programmable delay line that makes 0.5 or 1-ns resolution steps. This allows for fine timing corrections so that from revolution to revolution the wedges will line up very accurately in time. The running local phase error determines what value is placed into this delay line. While servoing off the spirals it is important to switch to and then back from the wedge dump head in a timely fashion. This is accomplished by the mux control 151, shown in FIG. 4, that is triggered by the wedge dump trigger signal. Mux control 151 controls the three output muxes sending the output data to the appropriate head. Head selection is done by head port B and is set up before hand.

After a wedge is dumped the mux control switches back to the spiral head and servo tracking continues.

The last aspect of the servowriting process of the present invention is the verification and correction of the wedge data after it is written to the surface of a disk. During verification two adjacent half-tracks are written and then the head is brought back to straddle the two. This is the normal track center used by the drive in actual operation. There is a two prong approach used during the verification process. First, the analog amplitude of the signal at the beginning sync field and the ending verification field is measured with 10-bit flash ADC 108. The purpose of this test is to measure the signal and determine if phase coherency error exists between the two adjacent half-tracks. If the two half-track wedges don't perfectly line up in time, the amplitude will be lower than nominal, since a magnetic transition on two lined up half-tracks will be a larger amplitude than getting two half amplitude levels spread out in time, and therefore the suspect wedge must then be rewritten or relocated. An alternative wedge verification method may be used which employs a bit-by-bit comparison technique. Returning to FIG. 7, during the bit-by-bit comparison each digital wedge data bit coming back from the drive gets compared to the corresponding bit coming out of the previously explained wedge dump circuit, specifically, shift register 149. The data coming from the drive feeds one side of XOR gate 152 and data coming from the wedge dump circuit shift register 149 feeds the other side. Bit-by-bit comparisons of the two streams of data are thus compared against each other. This output feeds flop 153 that synchronizes the comparison to write clock and it's output clocks counter 154 every time there is a mismatch. At the same time this count gets latched into the B data lines of dual-port RAM 155. So at the end of the test of each wedge the quantity of error mismatches can be read with input port 156 and then the actual locations throughout the wedge where mismatches occurred may be read with dual-port RAM 155 and the microprocessor may selectively choose to ignore or take action on any given mismatch by rewriting the data over again or even abort and write wedges in another angular location.

Figure 10:
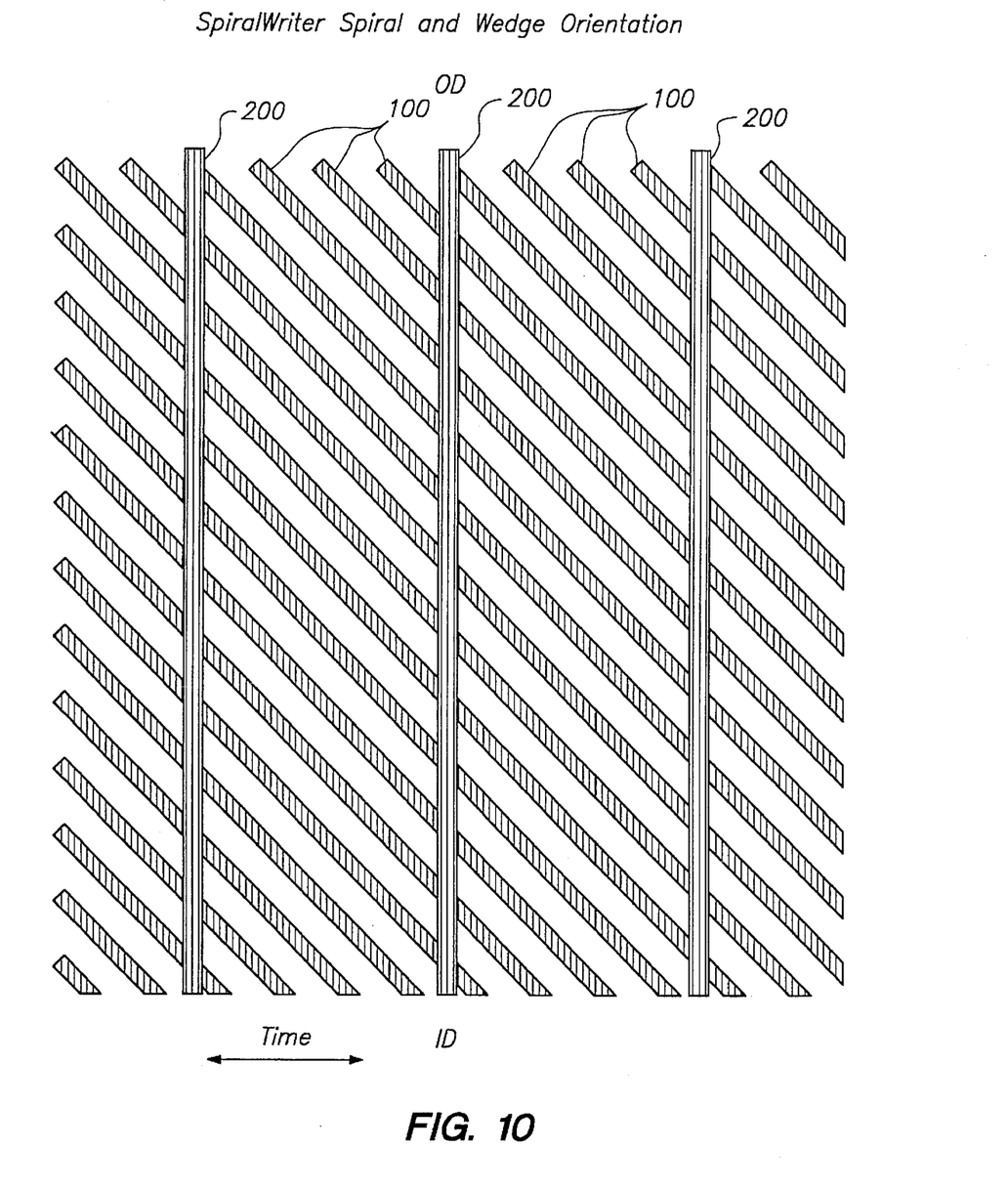
FIG. 10 is a highly diagrammatic, linearized, representation of a disk surface servowritten in accordance with the present invention showing recorded spirals and servo wedges.

FIG. 10 illustrates the magnetic patterns produced during the present servowriting process on a linearized representation of the recording surface containing diagonal spirals 100. The vertical lines represent the radially extending servo wedge patterns 200 on which the drive will eventually servo during normal operation, at which time the spirals 100 will eventually be erased or overwritten, since they will no longer be needed. Time is represented along the horizontal axis and radial position is represented along the vertical axis. FIG. 10 shows the "coast" region where, during the writing of the spiral tracks 100, head 12 has a nearly constant velocity. It is mathematically convienient, but not necessary, to set up the seek profile so that the accelerate and decelerate portions of the stroke are outside the active data region, and by employing a more aggressive accelerate/decelerate seek profile, spiral consistency can be readily be achieved. Also, because the time that the arm switches from accelerate, to coast, to decelerate are well characterized, it is easy to mathematically extrapolate radial arm position, even when using the extreme case of accelerating for half the stroke and decelerating for the other half. As the quality of the drive increases the quality of the spiral servo positioning accuracy matches it. As the head gaps and width get smaller the sharpness and precision of the individual bit locations and spiral peak crossings increase concurrently, hence more and more spirals 100 can fit between servo wedge patterns 200, thereby allowing the precision of the present servowriting method to scale with improving disk technology (limited by the seek consistency, which has been found to be quite good, and also by the CPU processing power).

Having thus described an embodiment of the invention, it will now be appreciated that the objects of the invention have been fully achieved, and it will be understood by those skilled in the art that many changes in construction and widely differing embodiments and applications of the invention will suggest themselves without departing from the true spirit and scope of the invention. The disclosure and the description herein are purely illustrative and are not intended to be in any sense limiting.

What is claimed is:

1. A method of servowriting a disk drive having a magnetic read/write head and a rotating disk medium with a data storage region thereon, the method comprising:

detecting an index mark corresponding to a particular rotational phase of the disk medium, the detecting step including:

recording a generally circular clock track on the disk medium at a boundary of the data storage region;

reading the clock track to monitor rotational phase; and outputting the index mark at the particular rotational phase;

writing a spiral data track in the data storage region beginning at a predetermined time relative to a detection of the index mark, as determined by the detecting step, by performing an open loop seek of the head from the clock track across the data storage region while concurrently writing a data pattern which includes embedded timing data;

moving the head to the data storage region;

reading a portion of the spiral data track;

extracting the embedded timing data from the read portion of the spiral data track to re-establish index mark at the particular rotational phase of the disk medium;

identifying rotational phase status of the disk medium relative to the re-established index mark based upon the extracted timing data;

determining a time offset from the reading of the portion of the spiral data track to the re-established index mark;

calculating radial head location information from said time offset;

selectively positioning the head radially within the data storage region using the calculated radial head location information; and writing wedge servo data within the data storage region at the selected radial position at a selected rotational phase, as determined by the rotational phase status.

2. The method of claim 1, wherein the recording step is performed with the read/write head of the disk drive.

3. The method of claim 1, wherein the data pattern comprises a high frequency periodic pattern having periodically suppressed cycles and wherein the embedded timing data comprises the periodically suppressed cycles.

4. A method of servowriting a disk drive having a magnetic read/write head and a rotating disk medium with a data storage region thereon, the method comprising:

recording a generally circular clock track on the disk medium at a boundary of the data storage region, the clock track including an index mark corresponding to a particular rotational phase of the disk medium;

reading the clock track to detect the index mark;

writing a plurality of spiral data tracks in the data storage region by performing a series of open loop seeks of the head from the clock track across the data storage region while concurrently writing a data pattern which includes embedded timing data, wherein the beginning of each open loop seek initiated at regular spaced intervals from the detection of the index mark as determined by the reading step;

moving the head to the data storage region;

reading a portion of each of the spiral data tracks;

extracting the embedded timing data from each read portion of the spiral data tracks to re-establish the index mark at the particular rotational phase of the disk medium;

identifying rotational phase status of the disk medium relative to the re-established index mark based upon the extracted timing data;

determining a time offset from the reading of the portion to the re-established index mark;

calculating radial head location information from said time offset;

selectively positioning the head radially within the data storage region using the calculated radial head location information; and writing wedge servo data within the data storage region at the selected radial position at a selected rotational phase, as determined by the rotational phase status.

5. The method of claim 4, wherein the recording step is performed with the read/write head of the disk drive.

6. The method of claim 4, wherein the data pattern comprises a high frequency periodic pattern having periodically suppressed cycles and wherein the embedded timing data comprises the periodically suppressed cycles.

7. A method of self-servowriting a disk drive having a magnetic read/write head and a rotating disk medium with a data storage region thereon, the method comprising:

recording with the head a generally circular clock track on the disk medium at a boundary of the data storage region, the clock track including an index mark corresponding to a particular rotational phase of the disk medium;

reading the clock track to detect the index mark;

writing a spiral data track in the data storage region beginning at a predetermined time relative to a detection of the index mark, as determined by the reading step, by performing an open loop seek of the head from the clock track across the data storage region while concurrently writing a high frequency data pattern, the spiral data track including embedded timing data referenced to the detected index mark;

moving the head to the data storage region;

reading a portion of the spiral data track;

extracting the embedded timing data from the read portion of the spiral data track to re-establish the index mark at the particular rotational phase;

identifying rotational phase status of the disk medium relative to the re-established index mark based upon the extracted timing data;

determining a time offset from the reading of the portion to the re-established index mark calculating radial head location information from said time offset;

selectively positioning the head radially within the data storage region using the calculated radial head location information; and writing wedge servo data within the data storage region at the selected radial position at a selected rotational phase, as determined by the rotational phase status.

* * * * *